US010565539B2

(12) United States Patent
Braham et al.

(10) Patent No.: US 10,565,539 B2
(45) Date of Patent: Feb. 18, 2020

(54) APPLYING AREA OF FOCUS TO WORKFLOW AUTOMATION AND MEASURING IMPACT OF SHIFTING FOCUS ON METRICS

(71) Applicant: International Business Machines Corporation, Armonk, NY (US)

(72) Inventors: Adam D. Braham, Rochester, MN (US); David W. Granum, Rochester, MN (US); Jon C. Rossow, Rochester, MN (US); Jeffrey A. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1299 days.

(21) Appl. No.: 14/535,931

(22) Filed: Nov. 7, 2014

(65) Prior Publication Data

US 2016/0132810 A1    May 12, 2016

(51) Int. Cl.
   *G06Q 10/06*    (2012.01)
(52) U.S. Cl.
   CPC ............. *G06Q 10/06393* (2013.01); *G06Q 10/063112* (2013.01); *G06Q 10/06311* (2013.01)
(58) Field of Classification Search
   CPC ..... G06Q 10/06393; G06Q 10/063112; G06Q 10/06311
   USPC ........................................................ 705/7.39
   See application file for complete search history.

(56) References Cited

U.S. PATENT DOCUMENTS

| 7,440,933 | B2 | 10/2008 | Abrashkevich et al. |
| 7,925,594 | B2 | 4/2011 | Jaligama et al. |
| 8,145,449 | B2 | 3/2012 | Shimada et al. |
| 8,489,444 | B2 | 7/2013 | Bhaskaran et al. |
| 8,538,787 | B2 | 9/2013 | Braun et al. |

(Continued)

FOREIGN PATENT DOCUMENTS

| WO | 98/45775 A1 | 10/1998 |
| WO | 2007/005123 A2 | 1/2007 |

OTHER PUBLICATIONS

Customer Experience Benchmark from Convergys and BenchmarkPortal Enables Companies to Rank Contact Center Performance. Business Wire. Jun. 4, 2003: 5345.*

(Continued)

*Primary Examiner* — Timothy Padot
(74) *Attorney, Agent, or Firm* — William H. Hartwell; Madeline F. Schiesser; Keohand & D'Alessandro PLLC

(57) ABSTRACT

Approaches presented herein enable measuring an impact on performance metrics of shifting a performance focus based on an assignment of communications to a resource based on a performance area in a customer support environment. Specifically, resources, each with several performance area attributes, are assigned performance scores. A performance focus manager selects a shifting performance area of focus and assigns communications to the resources based on the selected performance area. A history manager maintains a set of feedback performance metrics in a selected performance category, including a subset of metrics establishing a baseline for the category. The feedback performance metrics may be queried to determine how a shift in performance focus impacts a performance category and if the performance metrics of the category are within a tolerance.

20 Claims, 5 Drawing Sheets

(56) References Cited

U.S. PATENT DOCUMENTS

| | | |
|---|---|---|
| 8,724,797 B2 | 5/2014 | Chishti et al. |
| 8,768,976 B2 | 7/2014 | McLachlan et al. |
| 8,938,063 B1* | 1/2015 | Hackbarth .......... H04M 3/5175 379/265.06 |
| 2002/0123983 A1 | 9/2002 | Riley et al. |
| 2003/0140037 A1 | 7/2003 | Deh-Lee |
| 2003/0144895 A1 | 7/2003 | Aksu et al. |
| 2004/0044542 A1 | 3/2004 | Beniaminy et al. |
| 2004/0148385 A1 | 7/2004 | Srinivasan et al. |
| 2004/0230404 A1 | 11/2004 | Messmer et al. |
| 2006/0233348 A1* | 10/2006 | Cooper ............ G06Q 10/06375 379/265.06 |
| 2007/0133781 A1 | 6/2007 | Febonio et al. |
| 2008/0004924 A1 | 1/2008 | Cao et al. |
| 2009/0013216 A1 | 1/2009 | Abrashkevich et al. |
| 2009/0271274 A1 | 10/2009 | Baunach |
| 2010/0082380 A1 | 4/2010 | Merrifield, Jr. et al. |
| 2010/0083029 A1 | 4/2010 | Erickson et al. |
| 2010/0095157 A1 | 4/2010 | Aoyama et al. |
| 2010/0158236 A1* | 6/2010 | Chang ................. H04M 3/5175 379/265.03 |
| 2011/0161274 A1 | 6/2011 | Gao et al. |
| 2011/0255682 A1* | 10/2011 | Flockhart ............ G06Q 10/06 379/265.03 |
| 2012/0051536 A1* | 3/2012 | Chishti ............... H04M 3/5175 379/265.06 |
| 2013/0236002 A1* | 9/2013 | Jennings ................ H04M 3/00 379/265.12 |

OTHER PUBLICATIONS

Optimize your call center through simulation. Hall, Bill; Anton, Jon. Call Center Solutions; Norwalk vol. 17, Iss. 3, (Sep. 1998): 54-59.*

Rockwell SSD announces Call Center Simulator. Business Wire Feb. 4, 1997: 02041198.*

Charles A. Guiliano, USPTO Office Action, U.S. Appl. No. 14/039,190, Notification dated Jul. 24, 2015, 20 pages.

Charles A. Guiliano, USPTO Final Office Action, U.S. Appl. No. 14/039,190, Notification dated Nov. 6, 2015, 21 pages.

Charles A. Guiliano, USPTO Office Action, U.S. Appl. No. 14/039,190, Notification dated Mar. 18, 2016, 16 pages.

Charles A. Guiliano, USPTO Final Office Action, U.S. Appl. No. 14/039,190, Notification dated Sep. 28, 2016, 26 pages.

Charles A. Guiliano, USPTO Office Action, U.S. Appl. No. 14/039,190, Notification dated Mar. 8, 2017, 21 pages.

Gupta, Rajeev et al., "Automating ITSM Incident Management Process", International Conference on Automonic Computing, IEEE Computer Society, 2008, pp. 141-150.

Charles A. Guiliano, USPTO Final Office Action, U.S. Appl. No. 14/039,190, Notification dated Sep. 5, 2017, 22 pages.

Kate Acomb et al., "Technical Support Dialog Systems: Issues, Problems, and Solutions", HTL 2007 Workshop: "Bridging the Gap: Academic and Industrial Research in Dialog Technology", Rochester, NY, Apr. 26, 2007, 7 pages.

* cited by examiner

APPLYING AREA OF FOCUS TO WORKFLOW AUTOMATION AND MEASURING IMPACT OF SHIFTING FOCUS ON METRICS

TECHNICAL FIELD

This invention relates generally to processing of communications in a customer support environment and, more specifically, to measuring impact of shifting an area of performance focus.

BACKGROUND

In a typical system in which work is assigned to resources, such as a customer support center for example, work may be assigned based on resource availability and technical training of the resource. A resource is typically a human agent, a person with technical knowledge, etc. Communications, which may be in the form of a voice communication, a textual communication, a video communication and/or the like, may enter the system from customers or others seeking support from the center. These communications typically contain work items describing a customer problem. A resource may be assigned to the communication and/or work item based in part on the resource availability and a match between the resource technical training and communication or work item.

SUMMARY

In general, embodiments described herein provide for measuring an impact on performance metrics of shifting a performance focus based on an assignment of communications to a resource based on a performance area in a customer support environment. Specifically, resources, each with several performance area attributes, are assigned performance scores. A performance focus manager selects a shifting performance area of focus and assigns communications to the resources based on the selected performance area. A history manager maintains a set of feedback performance metrics in a selected performance category, including a subset of metrics establishing a baseline for the category. The feedback performance metrics may be queried to determine how a shift in performance focus impacts a performance category and if the performance metrics of the category are within a tolerance.

One aspect of the present invention includes a method for optimizing processing of communications, the method comprising the computer-implemented steps of: assigning a performance score for a first performance category and a second performance category to each of a plurality of human support resources, each performance score being an assessment of effectiveness in a category of performance associated with a human support resource; maximizing processing of the communications over a first period of time according to the first performance category by assigning the communications to the plurality of human support resources based on performance scores corresponding to enhancing performance in the first performance category; recording a first set of feedback metrics corresponding to the first performance category, wherein the first set of feedback metrics establishes a baseline for the first performance category; maximizing processing of the communications over a second period of time according to the second performance category by assigning the communications to the plurality of human support resources based on performance scores corresponding to enhancing performance in the second performance category; recording a second set of feedback metrics corresponding to the first performance category over the second period of time; and determining if a difference between a representation of the second set of feedback metrics and a representation of the first set of feedback metrics is within a predetermined tolerance.

Another aspect of the present invention includes a system for optimizing processing of communications comprising: a memory medium comprising program instructions; a bus coupled to the memory medium; and a processor, for executing the program instructions, coupled to a source code correction engine via the bus that when executing the program instructions causes the system to: assign a performance score for a first performance category and a second performance category to each of a plurality of human support resources, each performance score being an assessment of effectiveness in a category of performance associated with a human support resource; maximize processing of the communications over a first period of time according to the first performance category by assigning the communications to the plurality of human support resources based on performance scores corresponding to enhancing performance in the first performance category; record a first set of feedback metrics corresponding to the first performance category, wherein the first set of feedback metrics establishes a baseline for the first performance category; maximize processing of the communications over a second period of time according to the second performance category by assigning the communications to the plurality of human support resources based on performance scores corresponding to enhancing performance in the second performance category; record a second set of feedback metrics corresponding to the first performance category over the second period of time; and determine if a difference between a representation of the second set of feedback metrics and a representation of the first set of feedback metrics is within a predetermined tolerance.

Yet another aspect of the present invention includes a computer program product for optimizing processing of communications, the computer program product comprising a computer readable storage device, and program instructions stored on the computer readable storage device, to: assign a performance score for a first performance category and a second performance category to each of a plurality of human support resources, each performance score being an assessment of effectiveness in a category of performance associated with a human support resource; maximize processing of the communications over a first period of time according to the first performance category by assigning the communications to the plurality of human support resources based on performance scores corresponding to enhancing performance in the first performance category; record a first set of feedback metrics corresponding to the first performance category, wherein the first set of feedback metrics establishes a baseline for the first performance category; maximize processing of the communications over a second period of time according to the second performance category by assigning the communications to the plurality of human support resources based on performance scores corresponding to enhancing performance in the second performance category; record a second set of feedback metrics corresponding to the first performance category over the second period of time; and determine if a difference between a representation of the second set of feedback metrics and a representation of the first set of feedback metrics is within a predetermined tolerance.

Still yet another aspect of the present invention includes a method for deploying a system for optimizing processing of communications, comprising: providing a computer infrastructure being operable to perform the steps of: assigning a performance score for a first performance category and a second performance category to each of a plurality of human support resources, each performance score being an assessment of effectiveness in a category of performance associated with a human support resource; maximizing processing of the communications over a first period of time according to the first performance category by assigning the communications to the plurality of human support resources based on performance scores corresponding to enhancing performance in the first performance category; recording a first set of feedback metrics corresponding to the first performance category, wherein the first set of feedback metrics establishes a baseline for the first performance category; maximizing processing of the communications over a second period of time according to the second performance category by assigning the communications to the plurality of human support resources based on performance scores corresponding to enhancing performance in the second performance category; recording a second set of feedback metrics corresponding to the first performance category over the second period of time; and determining if a difference between a representation of the second set of feedback metrics and a representation of the first set of feedback metrics is within a predetermined tolerance.

BRIEF DESCRIPTION OF THE DRAWINGS

These and other features of this invention will be more readily understood from the following detailed description of the various aspects of the invention taken in conjunction with the accompanying drawings in which.

Figure 1:
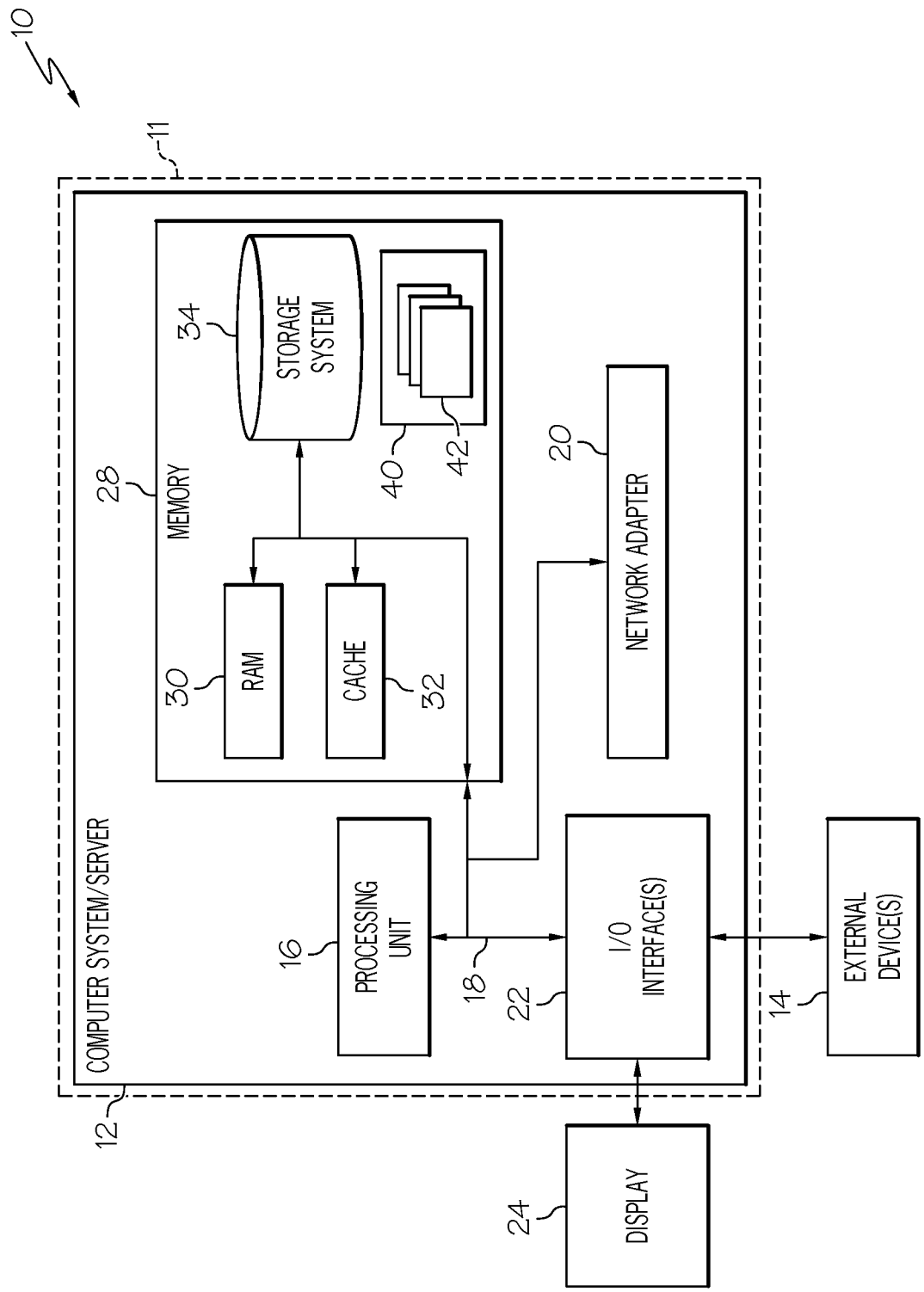
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments now will be described more fully herein with reference to the accompanying drawings, in which exemplary embodiments are shown. It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be understood that elements numbered as "_A-N" denote a set having at least one of the referenced item, and an element numbered as "_N" denotes any member of that set. Furthermore, it will be understood that similar elements in separate figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments described herein provide for measuring an impact on performance metrics of shifting a performance focus based on an assignment of communications to a resource based on a performance area in a customer support environment. Specifically, resources, each with several performance area attributes, are assigned performance scores. A performance focus manager selects a shifting performance area of focus and assigns communications to the resources based on the selected performance area. A history manager maintains a set of feedback performance metrics in a selected performance category, including a subset of metrics establishing a baseline for the category. The feedback performance metrics may be queried to determine how a shift in performance focus impacts a performance category and if the performance metrics of the category are within a tolerance.

The approaches described herein contain numerous advantages over present methods including, but not limited to, the ability to take a list of candidate resources and apply a performance or business focus manager algorithm to intelligently select a resource from that list based on adjustable performance or business goals (such as developing lower skilled employees, improving employee efficiency metrics, or increasing customer satisfaction). Furthermore, the present approach also provides a mechanism for matching feedback and cost from a work item after it is complete with performance or business focus/goal manager recommendations, and reflecting on that data to measure an impact of adjusting the performance goals.

Referring now to FIG. 1, a computerized implementation 10 of an illustrative embodiment for optimizing processing of communications will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, deployed within a computer infrastructure 11, and which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud-computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 11 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system-executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for optimizing processing of communications. It should be understood that any other computers implemented under the present invention may have different components/software, but can perform similar functions.

As shown in FIG. 1, computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for optimizing processing of communications, which is stored in memory 28, storage system 34 and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, e.g., VCRs, DVRs, RAID arrays, USB hard drives, optical disk recorders, flash storage devices, and/or any other data processing and storage elements for storing and/or processing data. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
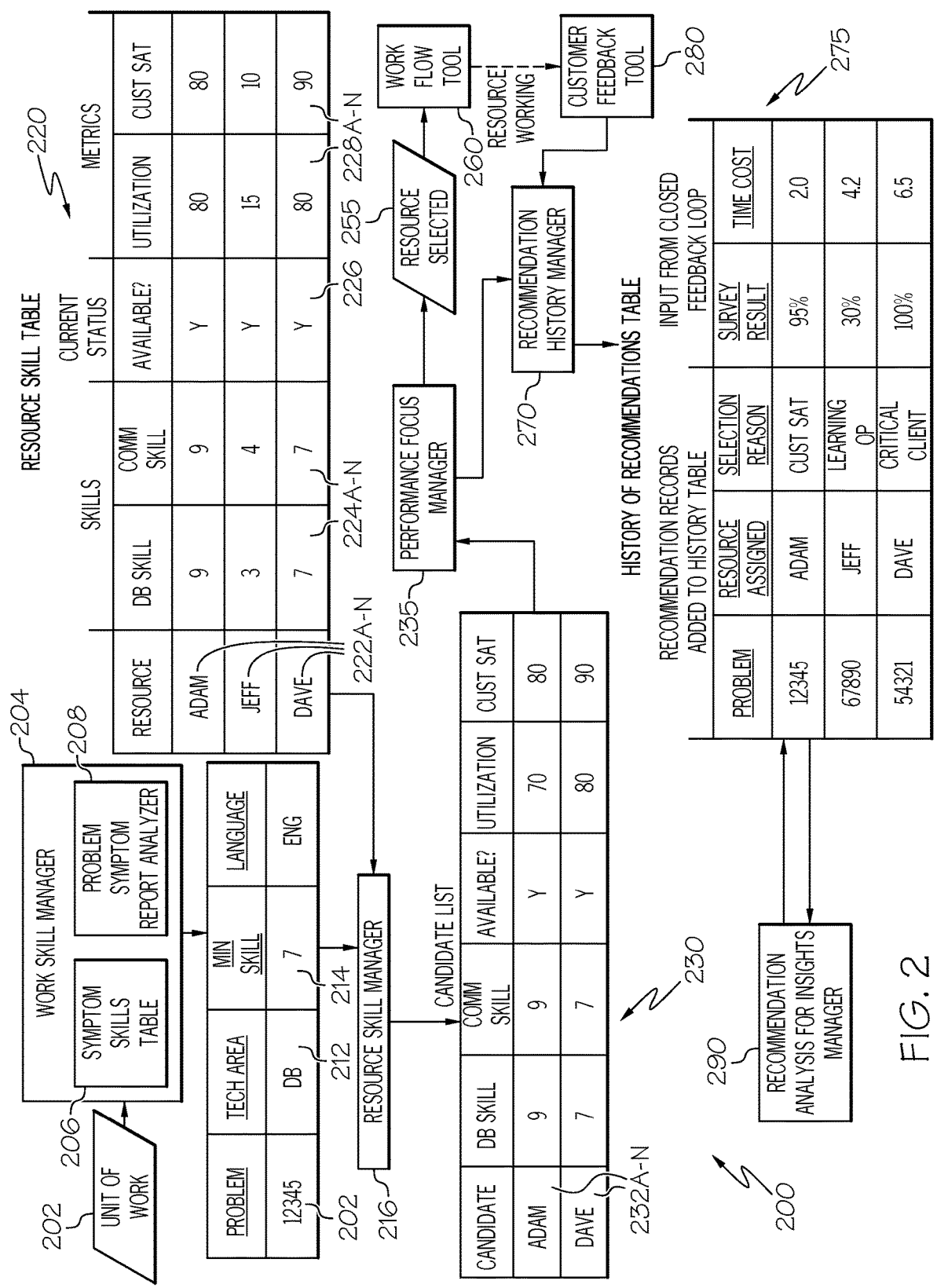
FIG. 2 shows a more detailed system architecture according to illustrative embodiments.

Referring now to FIG. 2, workflow automation tool 200 within a support system (e.g., a customer support system) is shown and described. In an embodiment of the present invention, communication 202 enters workflow automation tool 200 and is assigned skill area 212 and level of skill required 214 by work skills manager 204. Communication 202 may be any communication, whether in the form of a voice communication, a textual communication, a video communication and/or the like, from customers, employees, or others seeking support from a customer support environment, and in some embodiments may further comprise a description of a technical or other problem with which the communicator seeks assistance. In some embodiments, communication 202 may enter workflow automation tool 200 when a support system receives a communication from, for instance, a customer. An example of skill area 212, as discussed further below, is a technical ability/knowledge, performance ability, or other field of knowledge, in which a resource has capability. Level of skill required 214 includes a minimum measurement of the amount of skill a resource must have in skill area 212 in order to receive a communication 202 assigned to that skill area 212.

In some embodiments, work skills manager 204 automatically determines skill area 212 and level of skill required 214 based on a problem description in communication 202. In one embodiment of work skills manager 204, a problem symptom management computing system (i.e., any computing device), for instance, within, as a component of, or in communication with work skills manager 204 includes a database storage device (i.e., any type of data storage, including a relational model database server, that maintains information that relates to resource skills of resources) and a memory (i.e., one or more computer-readable storage media or devices). The database storage device comprises files on communication 202 and symptom skills table 206. In one embodiment, symptom skills table 206 includes in each row a record of a skill of resources that are available to address a work unit problem as well as keywords associated with symptoms related to a problem typically solved/dealt with by a possessor of that skill. Skills symptom table may also include, but is not limited to: historical symptoms and skill levels required to address communications 202; problems historically addressed and resolution times; and/or resources' existing knowledge of skills to address problems.

In an embodiment of work skills manager 204, the problem description of communications 202 files are analyzed (e.g., by a fuzzy search including synonyms and alternative tenses of keywords) by the problem symptom management system, and in some embodiments by problem symptom report analyzer 208 stored in the memory, to determine problem symptoms of communications 202 based on keywords of the problem description in communications 202. Problem symptom report analyzer 208 matches problem symptom keywords from the problem description of communication 202 with symptom keywords (e.g., read as a string from a row of the table) of symptom skills table 206, wherein a match and ranking is performed to identify the closest skill set (i.e., skill area 212) from symptom skills table 206 to address communication 202. For example, an exact match of the keywords and symptoms associated with input skills of symptom skills table 206 would result in the highest rank of available skills to address communications 202.

Furthermore, the search by problem symptom report analyzer 208 of input skills in symptom skills table 206 also yields a base/minimum skill level of the identified skill set (i.e., level of skill required 214) for solving the problem of communication 202. In some embodiments, each row of symptom skills table 206, each comprising a skill, is ranked, and a ranked list may be produced. To produce this ranking, problem symptom report analyzer 208 may, where each row comprises substantially the same number of keyword terms, use the zero (0) to one-hundred (100) percent scale formula:

$$Ranking = \frac{\text{\# input terms matched}}{\text{\# input terms}} - \frac{\text{\# returned row terms not matched}}{\text{\# returned row terms}}$$

Furthermore, in an embodiment of work skills manager 204, problem symptom report analyzer 208 may produce a ranked list of skills available based on the ranking described above and may identify the highest ranked skill (e.g., skill area 212).

A method for this automatic determination of skill area 212 and level of skill required 214 based on a problem description in communication 202 is further disclosed in commonly owned and co-pending application entitled "DETERMINING ONE OR MORE SKILLS REQUIRED TO ADDRESS THE PROBLEM SYMPTOMS OF A PROBLEM REPORT FILES", having U.S. patent application Ser. No. 14/039,190, and filed on Sep. 27, 2013.

In any case, work skills manager 204 determines skill area 212 and level of skill required 214 for communication 202 based on a problem description in communication 202. Skill area 212 may be used, for example, to classify an incoming communication or work item as: a database problem, requiring a resource with database skills; a communications problem, requiring a resource with communications skills; a software problem, requiring a resource with software skills; etc. In these examples, work skills manager 204 would also determine a minimum level of skill required for each of the skill areas: database, communications, and software.

Resource skill table 220, or the like, comprises a list of resources 222A-N and attributes for each of the Resources.

As illustrated, each of the resources 222A-N has an availability status 226, and performance scores, which include a set of skills 224A-N and a set of associated performance metrics 228A-N. In some embodiments, resources 222A-N are persons who offer support in a customer support environment. Availability status 226 describes whether a resource is currently free to receive communication 202, or unavailable, such as occupied with other work or offline. Skills 224A-N may include any skills and/or performance abilities deemed of importance to a company and/or organization in a customer support environment including technical skills (e.g., database, coding, software, and hardware skills), speaking skills (e.g., communication and natural language skills), experience (e.g., speed of calls, knowledge of phone system), personal knowledge (e.g., familiarity with products), etc. Skills 224A-N should not be construed as limited to merely positive abilities; rather skills 224A-N may also include negative skill areas, for instance, which reflect poorly on a resource, such as rudeness, inefficiency, and/or the like.

Associated performance metrics 228A-N may include any statistics on which a company and/or organization would choose to maintain a record of information associated with a resource's historical performance. Examples of associated performance metrics include resource utilization (e.g., percent of time utilized), customer satisfaction with the resource (e.g., a customer satisfaction rating history), education/experience of the resource, and/or any other measurable attribute related to operation of a customer support environment. Performance scores are generally an assessment of effectiveness in a category of performance associated with a human support resource. Performance scores in a performance category can include skills 224A-N and/or associated performance metrics 228A-N. Skills 224A-N and associated performance metrics 228A-N may be assessed by any indicia of resource skills and associated metrics, such as by quizzing/testing the resource (e.g., to determine a baseline or ongoing skill/metric level), assigning the resource points in a point system (e.g., each time a work item is successfully completed in a skill/metric area, the resource gets a point), or using customer feedback (e.g., to assign a skill/metric level).

Work skills manager 204 passes skill area 212 and level of skill required 214 for communication 202 to resource skill manager 216. In an embodiment, resource skill manager 216 queries resource skill table 220 for any resources 222A-N having a positive availability status 226 and having a skill 224N in skill area 212 at least equal to that of level of skill required 214. Resource skill manager 216 then assembles candidate list 230 of candidate resources 232A-N received from the query of resource skill table 220. Candidate list 230 includes associated performance metrics 228A-N of each candidate resource 232A-N. Resource skill manager 216 may then pass the completed candidate list 230 to performance focus manager 235 (performance focus manager 335 in FIG. 3, as will be further discussed below).

Figure 3:
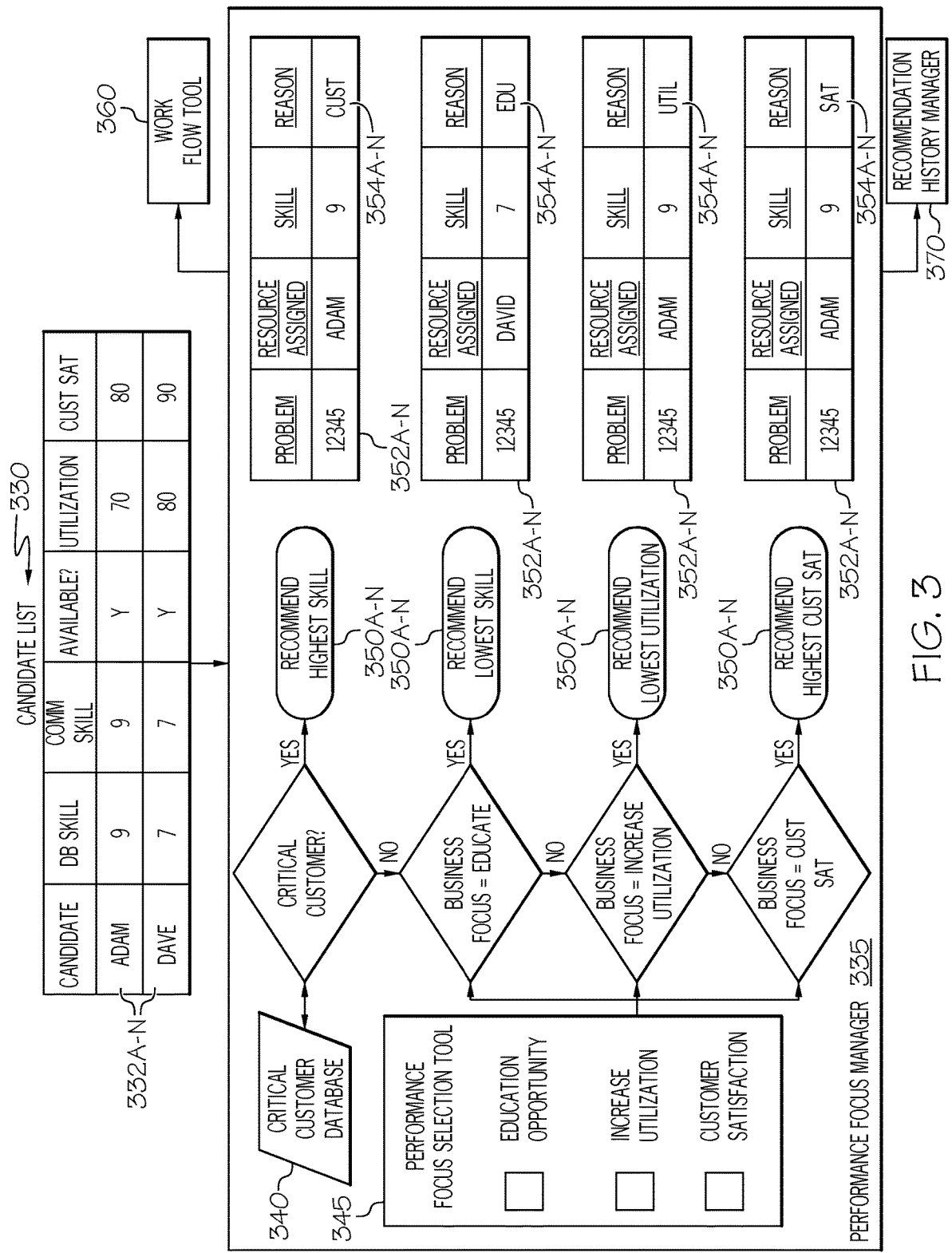
FIG. 3 shows a system component according to illustrative embodiments.

Referring now to FIG. 3, in addition to FIG. 2, performance focus manager 335 will be shown and described. Performance focus manager 335 receives candidate list 330 (candidate list 230 in FIG. 2) from resource skill manager 216 (FIG. 2), wherein each candidate resource 332A-N (candidate resources 232A-N in FIG. 2) meets the minimum level of skill required 214 for communication 202. In some embodiments, performance focus manager 335 checks a customer identity tag of communication 202 (FIG. 2) against critical customer database 340 to determine if the customer from whom the work came is a critical/sensitive customer. This checking can occur before or after the performance focus selection and initial recommendation described below, but in any case, if performance focus manager 335 determines that the customer identity matches a critical/sensitive customer in critical customer database 340, then communication 202 will be assigned to the resource on candidate list 330 best suited to work with communication 202 (e.g., the resource having the highest skill in skill area 212 (FIG. 2)).

In general, performance focus manager 335 comprises performance focus selection tool 345. Performance focus selection tool 345 is configured to enable a user (e.g., a human manager, or an external system), to select an area of performance focus or a performance goal. Examples of areas of performance focus include, but are not limited to, increased resource utilization, increased task completion/throughput time, increased customer satisfaction, providing resources with education opportunities, and language compatibility between resources and customers. Areas of performance focus, such as those listed above, may in some embodiments be pre-defined by performance focus selection tool 345. In other embodiments, areas of performance focus may be entered and defined by a user (e.g., a human manager, or an external system). One goal or likely result of selecting an area of performance focus may be to increase performance scores in that area. In general, performance focus manager 335 will provide one of recommendations 350 A-N to assign communication 202 (FIG. 2) to the resource of candidate list 330 with associated performance metrics 228A-N or skills 224A-N (FIG. 2) best aligned with or matching the performance goal/focus. In the case of a user-defined performance focus, in some embodiments performance focus manager 335 may use keywords, as described above with respect to work skills manager 204 (FIG. 2), to determine which performance metrics or skills best align with or match the performance focus.

For example, if a user selects a goal of increasing resource utilization (e.g., assigning work items to a resource that is not typically selected for work assignments to increase the amount of time the under-utilized resource is occupied with work items) with performance focus selection tool 345, then performance focus manager 335, in one embodiment, will recommend from candidate list 330 the candidate resource(s) 332A-N having the lowest resource utilization metric in order to increase how often that resource is assigned work items. In another example, if a user selects a goal of increasing customer satisfaction (e.g., improving a customer's experience or overall opinion of a service rendered) with performance focus selection tool 345, then performance focus manager 335, in one embodiment, will recommend from candidate list 330 the candidate resource(s) 332A-N having the highest customer satisfaction metric in order to provide customers with the resource most likely to perform to the satisfaction of the customer. In yet another example, if a user selects the goal of providing resources with education opportunities (e.g., providing situations that will allow a resource to train or practice his/her skills) with performance focus selection tool 345, then performance focus manager 335, in one embodiment, will recommend from candidate list 330 the candidate resource(s) 332A-N having the lowest skill score for the skill area of the work item in order to give the resource an opportunity to improve his skill score.

If there is, for instance, a high or low tie between two resources of candidate list 330 with associated performance metrics 228A-N or skills 224A-N (FIG. 2) best aligned with the performance goal/focus, then performance focus manager 335 in some embodiments may randomly select between the tied resources. In other embodiments, performance focus selection tool 345 may be configured to enable a user to select a secondary (tertiary, etc.) area of performance focus or performance goal in order to select between resources in the event of a tie. For example, if a user selects with performance focus selection tool 345 increased customer satisfaction as a primary goal and increasing resource utilization as a secondary goal, and performance focus manager 335 finds two or more candidate resources 332A-N having the highest customer satisfaction metric from candidate list 230, then in one embodiment performance focus manager 335 will select, from among the two or more candidate resources having the highest customer satisfaction metric, the candidate resource also having the lowest resource utilization metric.

Furthermore, for each recommendation by performance focus manager 335 of a selected resource 255 to receive communication 202 (FIG. 2), performance focus manager 335 creates a recommendation record 352N of the recommendation 350N of selected resource 255 and the reason for the recommendation 354N (i.e., performance goal). For example, if performance focus selection tool 345 was configured to select increasing utilization as the present performance goal, then performance focus manager 335 would recommend the candidate resource 332N having the lowest utilization metric, and create a record thereof stating which candidate resource 332N was recommended and that the reason for the recommendation was to increase utilization.

Moreover, performance focus manager 335 outputs recommendation record 352N to workflow tool 360 (workflow tool 260 in FIG. 2), which may extract the identities of selected resource 255 and communication 202 (FIG. 2) from recommendation record 352N and assign communication 202 to selected resource 255. Additionally, performance focus manager 335 outputs recommendation record 352N to recommendation history manager 370 (recommendation history manager 270 in FIG. 2), as will be further discussed below with reference to FIG. 4.

Figure 4:
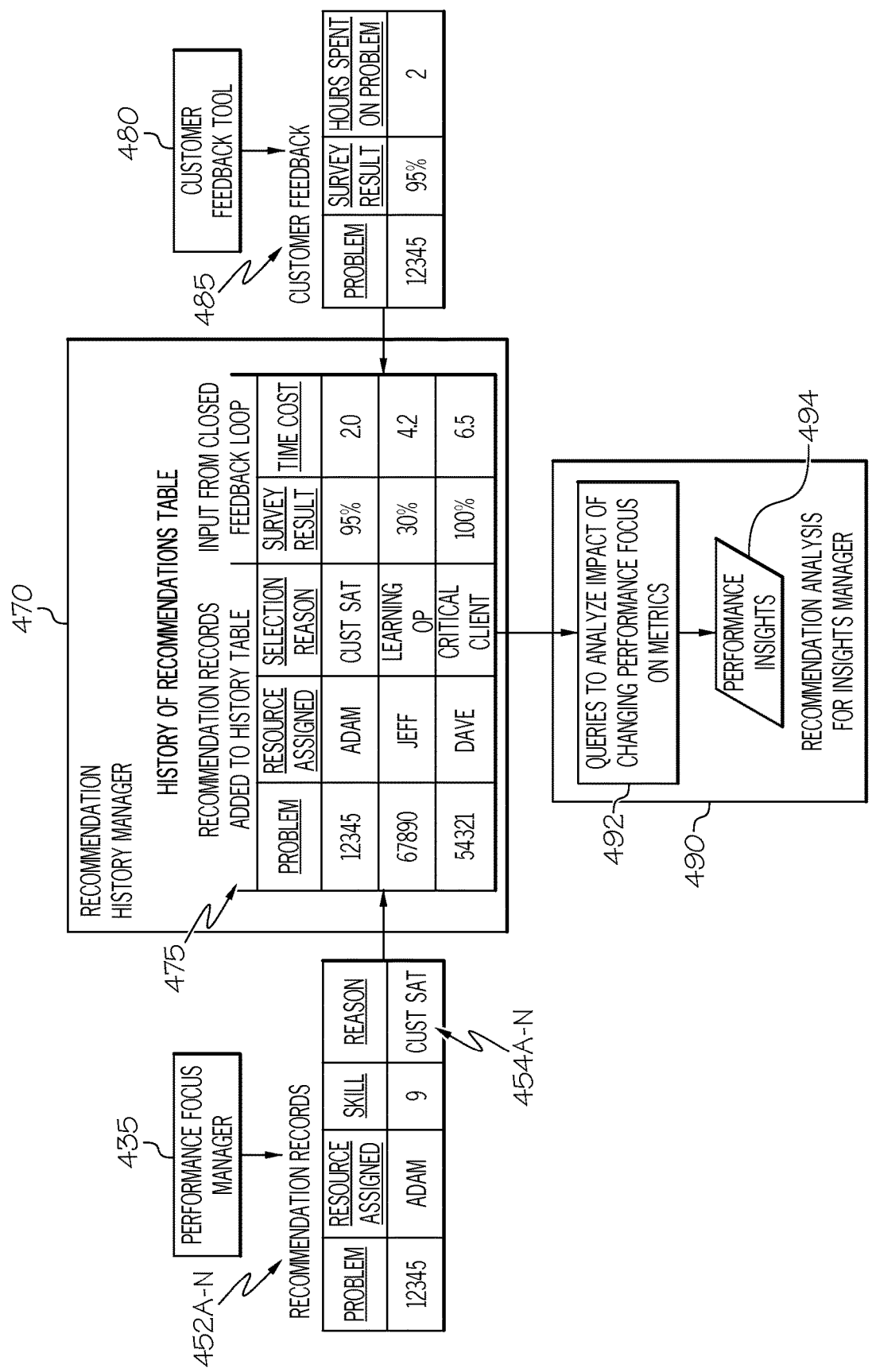
FIG. 4 shows another system component according to illustrative embodiments.

Referring now to FIG. 4, in addition to FIG. 2, recommendation history manager 470 (recommendation history manager 270 in FIG. 2) will be shown and described. Recommendation history manager 470 maintains history of recommendations table 475 (history of recommendations table 275 in FIG. 2), or the like, comprising recommendation records 452A-N (recommendation records 352A-N in FIG. 3), each comprising reasons for the recommendation 454A-N (reasons for the recommendation 354A-N in FIG. 3), received from performance focus manager 435 (performance focus manager 335 in FIG. 3), and feedback record 485 from customer feedback tool 480 (customer feedback tool 280 in FIG. 2). In one embodiment, recommendation history manager 470 may create a history record in history of recommendations table 475 for a newly received recommendation record 452N at any time, including, but not limited to, when the recommendation is being sent by performance focus manager 435 to workflow tool 260 (FIG. 2), when workflow tool 260 is processing the recommendation and assigning selected resource 255 to communication 202 (FIG. 2), or when selected resource 255 is working or having completed communication 202. Any recommendation record 452A-N may include, and is not limited to, an identifier of communication 202 (FIG. 2), an identity of selected resource 255, skill area 212 and the level of skill possessed by selected resource 255, associated performance metric 228N of selected resource 255 used in the selection, and reason for the recommendation 454N. Generally, recommendation history manager 470 will record at least reason for the recommendation 454N, and may track other identifiers such as the identity of communication 202 and the identity of selected resource 255.

After communication 202 is assigned to selected resource 255 by workflow tool 260 and selected resource 255 completes work on communication 202 (FIG. 2), customer feedback tool 480 seeks feedback and other information on the work completed by selected resource 255 on communication 202. For example, in one embodiment, customer feedback tool 480 poses a customer satisfaction survey (e.g., in the form of an email, an automated call, or website configured to receive submitted content) to a customer who submitted communication 202, soliciting a customer satisfaction rating or other ratings, which customer feedback tool 480 then records in feedback record 485. In another embodiment, customer feedback tool 480 records the time spent by resource 255 on communication 202 or the time cost of communication 202 in feedback record 485. In yet other embodiments, customer feedback tool 480 may measure other indicia of resource skills and associated metrics, such as reassessing (e.g., by quizzing the resource or assigning the resource points in a point system) a new level of skill the resource has obtained in a skill area after completing work on a communication in that area. In general, customer feedback tool 480 may record in feedback record 485, inter alia, survey results, customer satisfaction ratings, time cost measurements, and changes in resource skills and other metrics.

In any case, customer feedback tool 480 submits the customer feedback data it collects in feedback record 485 to recommendation history manager 470. Recommendation history manager 470 receives this feedback data, which may include, for example, a customer satisfaction survey result and a time cost/time spent on communication 202 data point. Recommendation history manager 470 may write, in one embodiment, the received feedback data to the history record in history of recommendations table 475 created by recommendation history manager 470 when it received recommendation record 452N for communication 202 from performance focus manager 435. In another embodiment, if a history record for communication 202 does not already exist in history of recommendations table 475, recommendation history manager 470 may query performance focus manager 435 for recommendation record 452N corresponding with communication 202 and create the history record and input data from recommendation record 452N and feedback record 485.

In some embodiments, recommendation analysis for insights manager 490 (recommendation analysis for insights manager 290 in FIG. 2) may perform queries 492 to analyze an impact of changing performance focus on metrics on data stored in history of recommendations table 475 to produce performance insights 494. In other embodiments of the present invention, it is envisioned that history of recommendations table 475 may also be queried by tools outside workflow automation tool 200 (FIG. 2). In any case, queries 492 may comprise, for example, a request for a data set from history of recommendations table 475 showing how a change in a performance focus area impacts performance metrics. On a received data set, recommendation analysis for insights manager 490 may perform any analysis or other process in order to produce performance insights 494.

For example, recommendation analysis for insights manager 490 may utilize a representation of a data set from history of recommendations table 475 to determine performance insights 494. In one embodiment, recommendation analysis for insights manager 490 may form the data set into an array or vectors by performance goals/focus for comparison between performance goals/foci. Furthermore, recommendation analysis for insights manager 490 may form the data set into an array or vectors to compare a first performance metric's baseline against the first performance metric when a second performance metric is the area of performance focus. In some embodiments, these vector/array comparisons may be represented visually in a graphical output or other visual representation. In another embodiment, recommendation analysis for insights manager 490 may determine an average amount a first performance metric changes with respect to a baseline when a second performance metric is the area of performance focus. A baseline for a performance metric may be established by recording, for instance, in history of recommendations table 475, a set of feedback metrics corresponding with the area of performance focus then presently selected by performance focus selection tool 345 (FIG. 3), the area of performance focus being the same as the performance metric. In another example, recommendation analysis for insights manager 490 may determine if a change in a first performance metric, between the baseline feedback and feedback when a second performance metric is the area of performance focus, is outside of a predetermined tolerance. For example, the change may be assessed as a difference between the averages of the two sets of feedback, or as a distance apart when the two feedback vectors are visually represented, for instance, as a graph. An example of a formula used to determine if a performance metric is within tolerance using averages of the metric's data points is:

$$\text{Tolerance} > |(\Sigma \text{baseline metrics})/(\# \text{ of baseline metrics}) - (\Sigma \text{metrics during other performance focus})/(\# \text{ of metrics during other performance focus})|$$

In yet another embodiment, if recommendation analysis for insights manager 490 determines a change in a performance metric is outside a tolerance, recommendation analysis for insights manager 490 may issue an advisory, for instance, as a feedback loop to performance focus selection tool 345 (FIG. 3), to return the area of performance focus to that performance metric.

Referring back now to FIG. 2, an illustrative example is presented. In an illustrative embodiment, a set of resources 222A-N, are assigned performance scores (e.g., skills 224A-N or associated performance metrics 228A-N), in at least two categories (e.g., in customer satisfaction and education opportunity). Over a first period of time, performance focus selection tool 345 (FIG. 3) is configured for customer satisfaction and performance focus manager 235 processes communications 202 by selecting resources to work communications 202 based on a customer satisfaction score of the resource. Recommendation history manager 270 records customer satisfaction feedback metrics, for instance, in history of recommendations table 275, from the worked communications 202 in order to form a baseline of feedback metrics for customer satisfaction when customer satisfaction is the performance focus. Over a second time period, performance focus selection tool 345 (FIG. 3) is configured for education opportunity and performance focus manager 235 processes communications 202 by selecting resources to work communications 202 based on an education opportunity (e.g., selecting lower skill score resources in order to develop skills) for the resource. Recommendation history manager 270 records customer satisfaction feedback metrics, for instance, in history of recommendations table 275, from the worked communications 202. Recommendation analysis for insights manager 290 then queries 492 (FIG. 4) history of recommendations table 275 for the sets of customer satisfaction feedback metrics from when customer satisfaction was the area of performance focus and when it was not. Recommendation analysis for insights manager 290 may then achieve one or more performance insights 494 (FIG. 4) by analyzing the returned sets of customer satisfaction feedback metrics. For example, recommendation analysis for insights manager 290 may determine if a difference between the two sets, or a representative of the two sets, is within a predetermined threshold. If recommendation analysis for insights manager 290 determines that the difference is not within the threshold, then recommendation analysis for insights manager 290 may then instruct performance focus selection tool 345 (FIG. 3) to return to a customer satisfaction performance focus or another performance focus. The performance focus manager 235 may then process communications 202 by selecting resources to work communications 202 based on a score of the resource corresponding to the new performance focus. This example is not intended to be limiting; for example, in some embodiments, a feedback metric baseline for a performance metric under the same performance focus may be established as a second step, after feedback metrics for the performance metric have been recorded under a different performance focus.

It will be appreciated that variations and modifications of the above-described process and system are envisioned as embodiments of the present invention. For example, in some embodiments, performance focus selection tool 345 (FIG. 3) may comprise an automated system which selects an area of performance focus (e.g., at a predetermined interval). In another embodiment, performance focus selection tool 345 may comprise an automated system which selects an area of performance focus in response to feedback from customer feedback tool 280, which in some embodiments may be configured to send customer feedback and metrics results to performance focus selection tool 345. Performance focus selection tool 345 may select a different area of performance focus if the returned customer feedback or metrics are unsatisfactory (e.g., below a pre-determined threshold). In yet another embodiment, performance focus selection tool 345 may query recommendation analysis for insights manager 290 in a feedback loop to inquire, for instance, whether the currently selected performance metric/performance goal/performance focus is adversely affecting other performance metrics and, if so, performance focus selection tool 345 may adjust selection of a performance focus area accordingly to correct this adverse effect (e.g., by shifting the performance focus to the adversely affected area).

Figure 5:
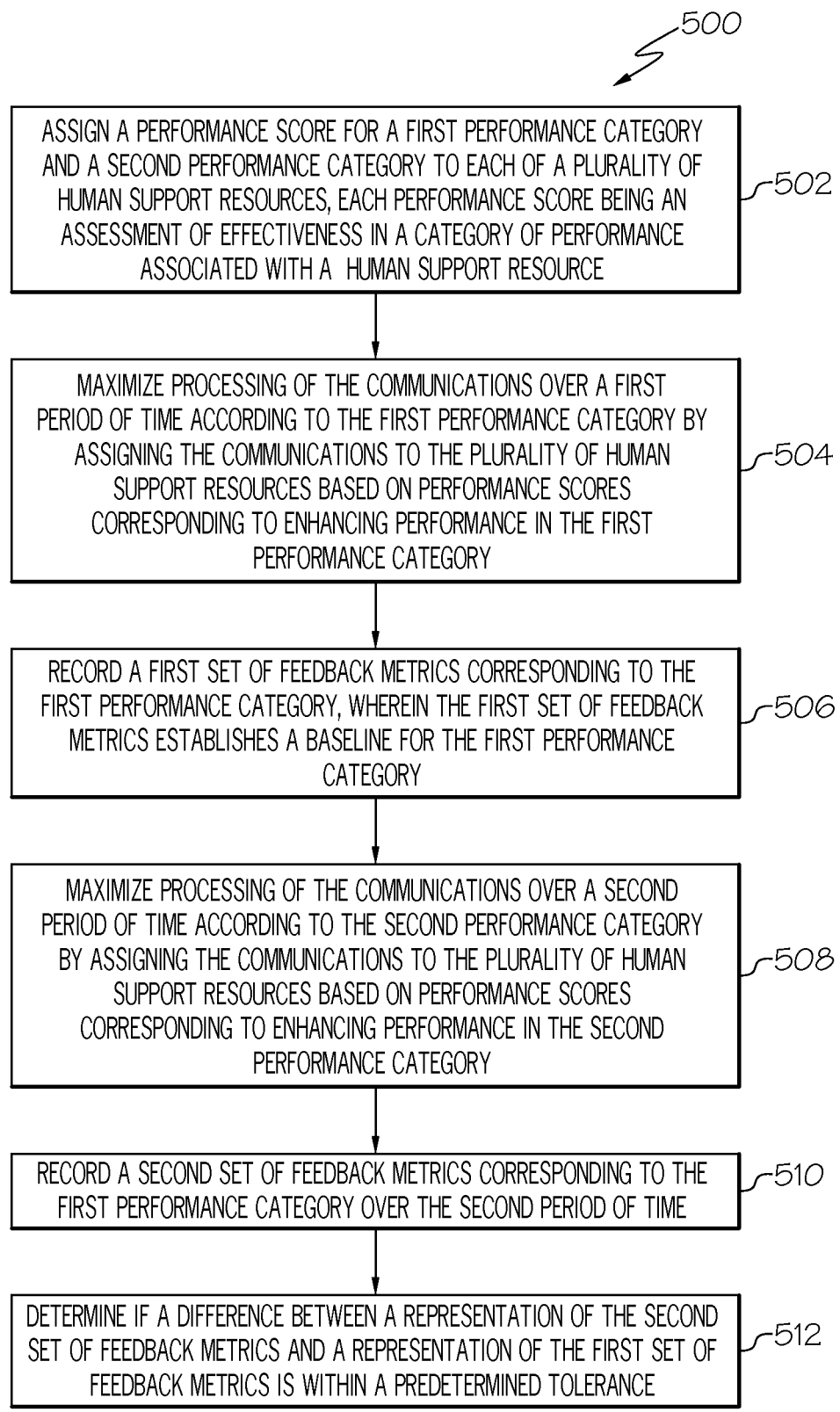
FIG. 5 shows a process flowchart for optimizing processing of communications according to illustrative embodiments.

As depicted in FIG. 5, a system (e.g., computer system 12) carries out the methodologies disclosed herein. Shown is a process flowchart 500 for optimizing processing of communications. At step 502, a performance score for a first performance category and a second performance category is assigned to each of a plurality of human support resources, wherein each performance score is an assessment of effectiveness in a category of performance associated with a human support resource. At step 504, processing of the communications over a first period of time according to the first performance category is maximized by assigning the communications to the plurality of human support resources based on performance scores corresponding to enhancing performance in the first performance category. At step 506, a first set of feedback metrics corresponding to the first performance category is recorded, wherein the first set of feedback metrics establishes a baseline for the first performance category. At step 508, processing of the communications over a second period of time according to the second performance category is maximized by assigning the communications to the plurality of human support resources based on performance scores corresponding to enhancing performance in the second performance category. At step 510, a second set of feedback metrics corresponding to the first performance category is recorded over the second period of time. At step 512, it is determined if a difference between a representation of the second set of feedback metrics and a representation of the first set of feedback metrics is within a predetermined tolerance.

Process flow 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for optimizing processing of communications. Thus, embodiments herein disclose a process for supporting computer infrastructure, comprising integrating, hosting, maintaining and deploying computer-readable code into a computing system (e.g., computer system 12), wherein the code in combination with the computing system is capable of performing the functions described herein.

In another embodiment, the invention provides a method that performs the process steps of the invention on a subscription, advertising and/or fee basis. That is, a service provider, such as a Solution Integrator, can offer to create, maintain, support, etc., a process for optimizing processing of communications. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches to optimizing processing of communications. While the invention has been particularly shown and described in conjunction with illustrative embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing processing of communications, the method comprising the computer-implemented steps of:

assigning a performance score, retrievable by a resource skill manager of a computer-implemented workflow automation tool within a support system, for a first performance category and a second performance category to each of a plurality of human support resources, each performance score being an assessment of effectiveness in a category of performance associated with a human support resource;

assigning a skill level, retrievable by the resource skill manager of the computer-implemented workflow automation tool within the support system, for each of a plurality of skill areas to each of the plurality of human support resources, wherein the assigned performance scores and the assigned skill levels for each of the plurality of human support resources are stored in a resource skill table within the support system according to a corresponding human support resource;

analyzing the communications, by a work skill manager, having a database storage device and a memory, of the computer-implemented workflow automation tool within the support system, to determine a skill area of each communication and a minimum threshold skill level of a resource to respond to the communication based on a problem symptom report analyzer of the work skill manager analyzing keywords in a problem description in the communication for correspondence to symptoms in a symptoms skills table of the work skill manager linking historic symptoms to a requisite skill level;

maximizing processing of the communications, by a performance focus manager of the computer-implemented workflow automation tool within the support system, over a first period of time according to the first performance category by, for each of a first set of the communications, selecting, by the performance focus manager, a set of resources in a candidate resource list having a skill level in the skill area of that communication above the minimum threshold skill level by querying, by the resource skill manager, the resource skill table and assigning, by a workflow tool of the computer-implemented workflow automation tool within the support system, the communication via a network to one resource of the selected set of resources of the plurality of human support resources based on a performance score of that resource corresponding to enhancing performance in the first performance category;

recording, by a recommendation history manager of the computer-implemented workflow automation tool within the support system, a first set of feedback metrics corresponding to the first performance category and storing the recorded first set of feedback metrics, wherein the first set of feedback metrics establishes a baseline for the first performance category and wherein the first set of feedback metrics comprises results from a first test applied to the plurality of resources;

maximizing processing of the communications, by the performance focus manager, over a second period of time according to the second performance category by, for each of a second set of the communications, selecting, by the performance focus manager, a set of resources in a candidate resource list having a skill level in the skill area of that communication above the minimum threshold skill level by querying, by the resource skill manager, the resource skill table and assigning, by the workflow tool, the communication via the network to one resource of the selected set of resources of the plurality of human support resources based on a performance score of that resource corresponding to enhancing performance in the second performance category;

recording, by the recommendation history manager, a second set of feedback metrics corresponding to the first performance category over the second period of time and storing the recorded second set of feedback metrics, wherein the second set of feedback metrics comprises results from a second test applied to the plurality of resources;

measuring, by a recommendation analysis for insights manager of the computer-implemented workflow automation tool within the support system, an impact of adjusting a performance category by determining if a difference between a representation of the second set of feedback metrics and a representation of the first set of feedback metrics is within a predetermined tolerance; and selecting, automatically by the performance focus manager, a third performance category in response to the determination and providing a recommendation as to a type of candidate from the candidate resource list to select to achieve an objective of the third performance category.

2. The method of claim 1, wherein the representation of the first set of feedback metrics is an average of the first set of feedback metrics, and the representation of the second set of feedback metrics is an average of the second set of feedback metrics.

3. The method of claim 1, further comprising the computer-implemented step of maximizing processing of the communications according to a third performance category by assigning the communications to the plurality of human support resources based on performance scores corresponding to enhancing performance in the third performance category, in response to the determination that the difference between the representation of the second set of feedback metrics compared with the representation of the first set of feedback metrics is not within the predetermined tolerance.

4. The method of claim 3, wherein each of the first, second, and third performance categories are one of: resource education, resource utilization, and customer satisfaction.

5. The method of claim 1, wherein the performance scores corresponding to enhancing performance in one of the first and second performance categories are performance scores in the one of the first and second performance categories associated with resources that when assigned to the communications result in increased performance scores.

6. The method of claim 1, further comprising the computer-implemented steps of:
recording a third set of feedback metrics corresponding to the second performance category over the first period of time;
recording a fourth set of feedback metrics corresponding to the second performance category over the second period of time, wherein the fourth set of feedback metrics establishes a baseline for the second performance category; and
determining if a difference between a representation of the third set of feedback metrics compared with a representation of the fourth set of feedback metrics is within a predetermined tolerance.

7. The method of claim 1, further comprising the computer-implemented steps of:
identifying a set of communications as associated with a critical customer;
exempting the set of communications from the maximizing processing of the communications over the first and second periods of time; and
assigning the set of communications to the plurality of human support resources based on best performance scores.

8. A system for optimizing processing of communications, comprising:
a memory medium comprising program instructions;
a bus coupled to the memory medium; and
a processor, for executing the program instructions, coupled to a source code correction engine via the bus that when executing the program instructions causes the system to:
assign a performance score, retrievable by a resource skill manager of a computer-implemented workflow automation tool within a support system, for a first performance category and a second performance category to each of a plurality of human support resources, each performance score being an assessment of effectiveness in a category of performance associated with a human support resource;
assign a skill level, retrievable by the resource skill manager of the computer-implemented workflow automation tool within the support system, for each of a plurality of skill areas to each of the plurality of human support resources, wherein the assigned performance scores and the assigned skill levels for each of the plurality of human support resources are stored in a resource skill table within the support system according to a corresponding human support resource;

analyze the communications, by a work skill manager, having a database storage device and a memory, of the computer-implemented workflow automation tool within the support system, to determine a skill area of each communication and a minimum threshold skill level of a resource to respond to the communication based on a problem symptom report analyzer of the work skill manager analyzing keywords in a problem description in the communication for correspondence to symptoms in a symptoms skills table of the work skill manager linking historic symptoms to a requisite skill level;

maximize processing of the communications, by a performance focus manager of the computer-implemented workflow automation tool within the support system, over a first period of time according to the first performance category by, for each of a first set of the communications, selecting, by the performance focus manager, a set of resources in a candidate resource list having a skill level in the skill area of that communication above the minimum threshold skill level by querying, by the resource skill manager, the resource skill table and assigning, by a workflow tool of the computer-implemented workflow automation tool within the support system, the communication via a network to one resource of the selected set of resources of the plurality of human support resources based on a performance score of that resource corresponding to enhancing performance in the first performance category;

record, by a recommendation history manager of the computer-implemented workflow automation tool within the support system, a first set of feedback metrics corresponding to the first performance category and store the recorded first set of feedback metrics, wherein the first set of feedback metrics establishes a baseline for the first performance category and wherein the first set of feedback metrics comprises results from a first test applied to the plurality of resources;

maximize processing of the communications, by the performance focus manager, over a second period of time according to the second performance category by, for each of a second set of the communications, selecting, by the performance focus manager, a set of resources in a candidate resource list having a skill level in the skill area of that communication above the minimum threshold skill level by querying, by the resource skill manager, the resource skill table and assigning, by the workflow tool, the communication via the network to one resource of the selected set of resources of the plurality of human support resources based on a performance score of that resource corresponding to enhancing performance in the second performance category;

record, by the recommendation history manager, a second set of feedback metrics corresponding to the first performance category over the second period of time and store the recorded second set of feedback metrics, wherein the second set of feedback metrics comprises results from a second test applied to the plurality of resources;

measuring, by a recommendation analysis for insights manager of the computer-implemented workflow automation tool within the support system, an impact of adjusting a performance category by determining if a difference between a representation of the second set of feedback metrics and a representation of the first set of feedback metrics is within a predetermined tolerance; and select, automatically by the performance focus manager, a third performance category in response to the determination and provide a recommendation as to a type of candidate from the candidate resource list to select to achieve an objective of the third performance category.

9. The system of claim 8, wherein the representation of the first set of feedback metrics is an average of the first set of feedback metrics, and the representation of the second set of feedback metrics is an average of the second set of feedback metrics.

10. The system of claim 8, the program instructions further causing the system to maximize processing of the communications according to a third performance category by assigning the communications to the plurality of human support resources based on performance scores corresponding to enhancing performance in the third performance category, in response to the determination that the difference between the representation of the second set of feedback metrics compared with the representation of the first set of feedback metrics is not within the predetermined tolerance.

11. The system of claim 10, wherein each of the first, second, and third performance categories are one of: resource education, resource utilization, and customer satisfaction.

12. The system of claim 8, wherein the performance scores corresponding to enhancing performance in one of the first and second performance categories are performance scores in the one of the first and second performance categories associated with resources that when assigned to the communications result in increased performance scores.

13. The system of claim 8, the program instructions further causing the system to:
record a third set of feedback metrics corresponding to the second performance category over the first period of time;
record a fourth set of feedback metrics corresponding to the second performance category over the second period of time, wherein the fourth set of feedback metrics establishes a baseline for the second performance category; and
determine if a difference between a representation of the third set of feedback metrics compared with a representation of the fourth set of feedback metrics is within a predetermined tolerance.

14. The system of claim 8, the program instructions further causing the system to:
identify a set of communications as associated with a critical customer;
exempt the set of communications from the maximizing processing of the communications over the first and second periods of time; and
assign the set of communications to the plurality of human support resources based on best performance scores.

15. A computer program product for optimizing processing of communications, the computer program product comprising a computer readable storage device, and program instructions stored on the computer readable storage device, to:

assign a performance score, retrievable by a resource skill manager of a computer-implemented workflow automation tool within a support system, for a first performance category and a second performance category to each of a plurality of human support resources, each performance score being an assessment of effectiveness in a category of performance associated with a human support resource;

assign a skill level, retrievable by the resource skill manager of the computer-implemented workflow automation tool within the support system, for each of a plurality of skill areas to each of the plurality of human support resources, wherein the assigned performance scores and the assigned skill levels for each of the plurality of human support resources are stored in a resource skill table within the support system according to a corresponding human support resource;

analyze the communications, by a work skill manager, having a database storage device and a memory, of the computer-implemented workflow automation tool within the support system, to determine a skill area of each communication and a minimum threshold skill level of a resource to respond to the communication based on a problem symptom report analyzer of the work skill manager analyzing keywords in a problem description in the communication for correspondence to symptoms in a symptoms skills table of the work skill manager linking historic symptoms to a requisite skill level;

maximize processing of the communications, by a performance focus manager of the computer-implemented workflow automation tool within the support system, over a first period of time according to the first performance category by, for each of a first set of the communications, selecting, by the performance focus manager, a set of resources in a candidate resource list having a skill level in the skill area of that communication above the minimum threshold skill level by querying, by the resource skill manager, the resource skill table and assigning, by a workflow tool of the computer-implemented workflow automation tool within the support system, the communication via a network to one resource of the selected set of resources of the plurality of human support resources based on a performance score of that resource corresponding to enhancing performance in the first performance category;

record, by a recommendation history manager of the computer-implemented workflow automation tool within the support system, a first set of feedback metrics corresponding to the first performance category and store the recorded first set of feedback metrics, wherein the first set of feedback metrics establishes a baseline for the first performance category and wherein the first set of feedback metrics comprises results from a first test applied to the plurality of resources;

maximize processing of the communications, by the performance focus manager, over a second period of time according to the second performance category by, for each of a second set of the communications, selecting, by the performance focus manager, a set of resources in a candidate resource list having a skill level in the skill area of that communication above the minimum threshold skill level by querying, by the resource skill manager, the resource skill table and assigning, by the workflow tool, the communication via the network to one resource of the selected set of resources of the plurality of human support resources based on a performance score of that resource corresponding to enhancing performance in the second performance category;

record, by the recommendation history manager, a second set of feedback metrics corresponding to the first performance category over the second period of time and store the recorded second set of feedback metrics, wherein the second set of feedback metrics comprises results from a second test applied to the plurality of resources;

measuring, by a recommendation analysis for insights manager of the computer-implemented workflow automation tool within the support system, an impact of adjusting a performance category by determining if a difference between a representation of the second set of feedback metrics and a representation of the first set of feedback metrics is within a predetermined tolerance; and select, automatically by the performance focus manager, a third performance category in response to the determination and provide a recommendation as to a type of candidate from the candidate resource list to select to achieve an objective of the third performance category.

16. The computer program product of claim 15, wherein the representation of the first set of feedback metrics is an average of the first set of feedback metrics, and the representation of the second set of feedback metrics is an average of the second set of feedback metrics.

17. The computer program product of claim 15, the computer readable storage device further comprising program instructions to maximize processing of the communications according to a third performance category by assigning the communications to the plurality of human support resources based on performance scores corresponding to enhancing performance in the third performance category, in response to the determination that the difference between the representation of the second set of feedback metrics compared with the representation of the first set of feedback metrics is not within the predetermined tolerance, wherein each of the first, second, and third performance categories are one of: resource education, resource utilization, and customer satisfaction.

18. The computer program product of claim 15, wherein the performance scores corresponding to enhancing performance in one of the first and second performance categories are performance scores in the one of the first and second performance categories associated with resources that when assigned to the communications result in increased performance scores.

19. The computer program product of claim 15, the computer readable storage device further comprising program instructions to:

record a third set of feedback metrics corresponding to the second performance category over the first period of time;

record a fourth set of feedback metrics corresponding to the second performance category over the second period of time, wherein the fourth set of feedback metrics establishes a baseline for the second performance category; and determine if a difference between a representation of the third set of feedback metrics compared with a representation of the fourth set of feedback metrics is within a predetermined tolerance.

20. The computer program product of claim 15, the computer readable storage device further comprising program instructions to:
- identify a set of communications as associated with a critical customer;
- exempt the set of communications from the maximizing processing of the communications over the first and second periods of time; and
- assign the set of communications to the plurality of human support resources based on best performance scores.

* * * * *